(12) United States Patent  (10) Patent No.: US 7,671,503 B2
Naito et al.  (45) Date of Patent: Mar. 2, 2010

(54) ROTATING ELECTRIC MACHINE AND ELECTRICALLY DRIVEN VEHICLE

(75) Inventors: Shinya Naito, Shizuoka-ken (JP); Haruyoshi Hino, Shizuoka-ken (JP); Keiko Murota, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 12/170,390

(22) Filed: Jul. 9, 2008

(65) Prior Publication Data

US 2008/0296988 A1 Dec. 4, 2008

Related U.S. Application Data

(60) Division of application No. 11/499,293, filed on Aug. 4, 2006, now Pat. No. 7,468,568, which is a continuation of application No. PCT/JP2005/001333, filed on Jan. 31, 2005.

(30) Foreign Application Priority Data

Feb. 6, 2004 (JP) ............................. 2004-031379

(51) Int. Cl.
*H02K 1/00* (2006.01)
(52) U.S. Cl. .................. 310/191; 310/75 C; 310/89; 310/268
(58) Field of Classification Search ................ 310/191, 310/75 C, 89, 98–101, 268
See application file for complete search history.

(56) References Cited

U.S. PATENT DOCUMENTS

| 2,453,523 A | 11/1948 | McCullough |
| 3,566,165 A | 2/1971 | Lohr |
| 4,132,281 A | 1/1979 | Gaddi |
| 4,536,668 A | 8/1985 | Boyer |
| 4,829,208 A | 5/1989 | Uchino |
| 4,877,987 A | 10/1989 | Flaig et al. |
| 5,014,800 A | 5/1991 | Kawamoto et al. |
| 5,036,213 A | 7/1991 | Isozumi |

(Continued)

FOREIGN PATENT DOCUMENTS

DE 411 877 C 4/1925

(Continued)

OTHER PUBLICATIONS

International Search Report for Application No. PCT/JP2004/007603 (the PCT counterpart of the parent application) mailed Aug. 24, 2004.

*Primary Examiner*—Thanh Lam
(74) *Attorney, Agent, or Firm*—Knobbe, Martens, Olson & Bear, LLP.

(57) ABSTRACT

A rotating electric machine whose output characteristics can be easily and freely adjusted and varied even in operation. The rotating electric machine is received in a housing of an electrically driven two-wheeled vehicle. A rotating shaft is connected to a rotor so as to form an axle. A stator is positioned opposite a rotor. A movable member is connected to a rotating member rotated about the rotating shaft by a regulating motor. The movable member is moved in the axial direction of the rotating shaft by the rotation of the rotating member. This movement causes the rotor to be rotatingly moved in the axial direction of the rotating shaft, changing relative position of the rotor and the stator.

10 Claims, 8 Drawing Sheets

U.S. PATENT DOCUMENTS

| | | | |
|---|---|---|---|
| 5,087,229 A | 2/1992 | Hewko et al. |
| 5,144,183 A | 9/1992 | Farrenkoof |
| 5,272,938 A | 12/1993 | Hsu et al. |
| 5,294,853 A | 3/1994 | Schluter et al. |
| 5,304,878 A | 4/1994 | Oda et al. |
| 5,442,250 A | 8/1995 | Stridsberg |
| 5,505,277 A | 4/1996 | Suganuma et al. |
| 5,570,752 A | 11/1996 | Takata |
| 5,581,136 A | 12/1996 | Li |
| 5,691,584 A | 11/1997 | Toida et al. |
| 5,755,304 A | 5/1998 | Trigg et al. |
| 5,818,134 A | 10/1998 | Yang et al. |
| 5,826,675 A | 10/1998 | Yamamoto |
| 5,834,874 A | 11/1998 | Krueger et al. |
| 5,915,493 A | 6/1999 | Nakayama |
| 5,960,901 A | 10/1999 | Hanagan |
| 6,046,518 A | 4/2000 | Williams |
| 6,121,711 A | 9/2000 | Nakahara et al. |
| 6,137,203 A | 10/2000 | Jermakian et al. |
| 6,199,652 B1 | 3/2001 | Mastoianni et al. |
| 6,321,863 B1 | 11/2001 | Vanjani |
| 6,590,306 B2 | 7/2003 | Terada |
| 6,765,327 B2 | 7/2004 | Hashimoto et al. |
| 6,943,478 B2 * | 9/2005 | Zepp et al. ............. 310/191 |
| 7,042,128 B2 * | 5/2006 | Zepp et al. ............. 310/191 |
| 7,116,027 B2 | 10/2006 | Naito et al. |
| 7,145,277 B2 | 12/2006 | Naito et al. |
| 7,173,357 B2 | 2/2007 | Naito et al. |
| 7,259,488 B2 | 8/2007 | Naito et al. |
| 7,268,462 B2 | 9/2007 | Ishihara et al. |
| 7,309,941 B2 | 12/2007 | Murota et al. |
| 7,323,799 B2 | 1/2008 | Naito et al. |
| 7,342,342 B2 | 3/2008 | Naitou et al. |
| 2001/0010439 A1 | 8/2001 | Klinger et al. |
| 2002/0117916 A1 | 8/2002 | Terada |
| 2003/0221887 A1 | 12/2003 | Hsu |
| 2006/0152104 A1 | 7/2006 | Hino et al. |
| 2006/0181172 A1 | 8/2006 | Naitou et al. |
| 2007/0029887 A1 | 2/2007 | Murota et al. |

FOREIGN PATENT DOCUMENTS

| | | |
|---|---|---|
| EP | 0 980 821 A2 | 2/2000 |
| EP | 1 220 427 A2 | 7/2002 |
| EP | 1 270 395 A3 | 3/2005 |
| FR | 1 534 007 | 7/1968 |
| JP | 43-10683 | 5/1968 |
| JP | 43-10683 B1 | 5/1968 |
| JP | 54-103509 | 7/1979 |
| JP | 60-34767 | 3/1985 |
| JP | 02-37027 | 5/1989 |
| JP | 03-215154 | 9/1991 |
| JP | 04-185207 | 7/1992 |
| JP | 05-199705 | 8/1993 |
| JP | 05-083518 | 11/1993 |
| JP | 05-300712 | 11/1993 |
| JP | 07-250465 | 9/1995 |
| JP | 08-080019 | 3/1996 |
| JP | 09-028067 | 1/1997 |
| JP | 09-037598 | 2/1997 |
| JP | 09-191611 | 7/1997 |
| JP | 11/034965 | 2/1999 |
| JP | 11-122886 | 4/1999 |
| JP | 2000-201451 | 7/2000 |
| JP | 2000-261988 | 9/2000 |
| JP | 2001-298901 | 10/2001 |
| JP | 2002-247822 | 8/2002 |
| JP | 2002-325412 | 11/2002 |
| JP | 2003-191883 | 7/2003 |
| JP | 2004-166369 | 6/2004 |

* cited by examiner

US 7,671,503 B2

ROTATING ELECTRIC MACHINE AND ELECTRICALLY DRIVEN VEHICLE

PRIORITY INFORMATION

This application is a divisional of U.S. application Ser. No. 11/499,293 filed Aug. 4, 2006, which is a continuation of International Application PCT/JP2005/001333, with an international filing date of Jan. 31, 2005, which claims priority under 35 U.S.C. § 119(a)-(d) to Japanese Patent Application No. 2004-031379, filed Feb. 6, 2004, the entire contents of these applications are hereby expressly incorporated by reference herein.

BACKGROUND OF THE INVENTION

1. Field of the Invention

The present invention relates to an electric rotating machine and electric vehicle whose output characteristics can be freely adjusted.

2. Description of the Related Art

Japanese Patent Application Laid-Open No. HEI 9-37598 relates to a control apparatus of a generator for a vehicle. In this invention, a radial gap motor is provided with an axial direction displacement mechanism that adjusts the gap between the stator and rotor. This axial direction displacement mechanism has a solenoid, and when the solenoid is excited, generation characteristics are changed by adjusting the gap between the rotor and stator by displacement in an axial direction.

However, according Japanese Patent Application Laid-Open No. HEI 9-37598, precise control is not possible since the rotor is displaced by a solenoid. Consequently, it is difficult to apply this invention to the motor of an electric vehicle, which requires precise control according to the driving force and vehicle speed. Also, as a sample implementation of the invention of Japanese Patent Application Laid-Open No. HEI 9-37598, an example is shown in which the stator is moved by a motor and screw, but with this configuration it is not possible to move a rotating rotor.

Thus, as a generator for a vehicle, it is desirable to use an axial gap motor that can be made cheaper and thinner than the radial gap motor used in Patent Document 1, and, with regard to gap adjustment, has more notable changes in generation characteristics than the radial gap motor.

The technology disclosed in Japanese Patent Publication No. 2749560, for example, is known as a technology for adjusting the gap between the stator teeth and the rotor magnet in an axial gap motor.

FIG. 1 is a principal-part cross-sectional diagram showing a conventional gap adjustable motor disclosed in Japanese Patent Publication No. 2749560.

In the motor shown in FIG. 1, aperture 4 is formed in the center part of the top surface of drum securing section 3 that incorporates rotating drum 2, and motor stator 5 that has a coil is located around this aperture 4.

Magnet 6 is located facing this motor stator 5, and this magnet 6 is attached to motor rotor 7 located above drum securing section 3.

Motor rotor 7 is connected to rotating drum 2 via fastening and adjustment member 8 located in aperture 4 of drum securing section 3.

Fastening and adjustment member 8 is a screw-shaped element with an externally threaded section formed on tip section 9, that is inserted into motor rotor 7 from above, and whose head 10 is locked on the top surface of motor rotor 7.

Shaft section 11 is passed through by motor rotor 7 and compression spring 12, and tip section 9 is screwed into a tapped (internally threaded) groove on the top surface of rotating drum 2. Compression spring 12 is located between motor rotor 7 and rotating drum 2, and applies force in a direction such that the top surface of rotating drum 2 and motor rotor 7 are moved apart.

According to this configuration, when fastening and adjustment member 8 is loosened by manipulation of head 10 of fastening and adjustment member 8, motor rotor 7 and rotating drum 2 are relatively moved apart by the restoring force of compression spring 12. As a result, gap G between magnet 6 of motor rotor 7 and motor stator 5 increases. Also, when fastening and adjustment member 8 is tightened, bush 13 and rotating drum 2 become relatively closer, and thus gap G decreases.

SUMMARY OF THE INVENTION

However, the above-described configuration of a gap adjustable axial gap motor is a configuration conceived for coping with product specification changes. That is to say, adjustment of the gap between the rotor and stator for an axial gap motor is performed manually, and therefore Japanese Patent Publication No. 2749560 discloses an embodiment whereby gap adjustment is possible only before installation in a product.

That is to say, a mode whereby a product is applied to an electric vehicle and gap adjustment is performed during operation in order to provide operation under optimal conditions has not been disclosed. Also, in Japanese Patent Publication No. 2749560, electromagnetic operation and manual operation are described, but a concrete embodiment is not disclosed. This is due to the fact that there was no necessity of studying a solution to the problem of actively changing motor characteristics during product operation as in the case of the driving source of an electric vehicle, such as a freely performing gap adjustment and changes, for example.

Although the configuration in Japanese Patent Application Laid-Open No. HEI 9-37598 can be envisioned as being applied to an axial gap motor, an axial gap motor undergoes large changes in characteristics in response to a slight gap variation, and therefore cannot be implemented with the configuration in Japanese Patent Application Laid-Open No. HEI 9-37598 described above.

Therefore, for a generator for a vehicle, it is necessary to be able to freely and easily adjust and modify output characteristics while the vehicle is running.

It is therefore an object of an embodiment of the present invention to provide an electric rotating machine and electric vehicle that allow output characteristics to be freely and easily adjusted and modified while running.

Accordingly, one aspect of the present invention comprises an electric rotating machine that employs a configuration that includes: a rotating shaft; a rotor connected to the rotating shaft; a stator located facing the rotor; and an adjustment section that adjusts the relative positions of the rotor and the stator in the rotating shaft axial direction; wherein the adjustment section has: an adjustment motor; a rotating member that is connected to the adjustment motor and rotates around the rotating shaft by rotation of the adjustment motor; and a movable member that moves in the rotating shaft axial direction by rotation of the rotating member, and moves the rotor in the rotating shaft axial direction.

According to the above described configuration, the rotating member rotates around the rotating shaft by rotation of the adjustment motor, and by rotation of this rotating member, the movable member moves in the rotating shaft axial direction and moves the rotor, and changes its relative position (gap) with respect to the stator. Thus, even when the rotor is rotating, it is possible to adjust the gap between the rotor and stator—in other words, to actively adjust the relative positions of the rotor and stator—and to increase attraction and repulsion generated between the two when high torque is necessary, and decrease attraction and repulsion generated between the two when fast rotation is necessary, thereby freely changing output characteristics.

Also, if an electric rotating machine with the above described configuration is, for example, an axial gap type electric rotating machine, the gap between the rotor and stator can be adjusted. Furthermore, if an electric rotating machine with the above described configuration is an electric rotating machine of other than axial gap type—for example, a radial gap type electric rotating machine which is an electric rotating machine that has a conical gap in facing areas of the rotor and stator, or the like—it can have a similar effect by adjusting the gap between the rotor and stator and the facing areas, respectively.

Also, with an electric rotating machine with the above described configuration, since it is only necessary to rotate the rotating member by rotation of the adjustment motor, and there are no restrictions on the type, shape or location of the adjustment motor that adjusts the gap between the rotor and stator, a low-cost motor can be selected. Thus, in an electric rotating machine with the above described configuration, a separate adjustment motor layout using a pulley or the like is also possible, and therefore the overall configuration can be made compact.

Furthermore, with an electric rotating machine with the above described configuration, since the rotor is moved with respect to the stator by a movable member, a lower-torque adjustment motor can be used than when a heavy stator composed of an iron core and copper wire is moved.

Generally, when an electric rotating machine is used for an electric vehicle or the like, significant vibrations and impact loads are exerted on the electric rotating machine itself, and therefore if the electric rotating machine has a heavy stator, it is necessary for the heavy stator to have a configuration that can withstand large loads. With this configuration, if the stator is moved, it is difficult to secure it to the case, etc., with bolts.

In addition, a mechanism is necessary that prevents stator rotation while allowing movement in an axial direction, and the structure that can withstand large loads is necessary, so that the apparatus becomes structurally large and heavy.

In contrast, according to the above described configuration of an electric rotating machine, since the rotor is moved, these large and heavy structures are unnecessary.

Another aspect of the present invention comprises an electric rotating machine that employs a configuration that includes: a rotating shaft; a rotor connected to the rotating shaft; a stator located facing the rotor; a movable member that moves the rotor in the rotating shaft axial direction by movement in an axial direction of the rotating shaft, and changes the relative position with respect to the stator; a rotating member that rotates around the rotating shaft; and an adjustment motor that is connected to the rotating member and rotates the rotating member; wherein the movable member is moved by converting rotation of the rotating member to displacement in the axial direction.

According to the above described configuration, the rotating member rotates around the rotating shaft by rotation of the adjustment motor, the rotation of this rotating member is converted to displacement in the rotating shaft axial direction, the movable member is moved in the rotating shaft axial direction, the rotor is moved, and the relative position (gap) with respect to the stator is changed. Thus, even when the rotor is rotating, it is possible to adjust the gap between the rotor and stator and actively adjust the relative positions of the rotor and stator, and by increasing attraction and repulsion generated between the two when high torque is necessary, and decreasing attraction and repulsion generated between the two when fast rotation is necessary, it is possible to freely change output characteristics.

As described above, according to certain aspects of the present invention, it is possible to easily and reliably adjust the gap between the rotor and stator, and therefore possible to actively adjust the relative positions of the rotor and stator, and by increasing attraction and repulsion generated between the two when high torque is necessary, and decreasing attraction and repulsion generated between the two when fast rotation is necessary, it is possible to freely change output characteristics.

It also should be noted that certain objects and advantages of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

DETAILED DESCRIPTION OF THE PREFERRED EMBODIMENTS

Embodiments of the present invention will now be described with reference to the accompanying drawings.

Figure 1:
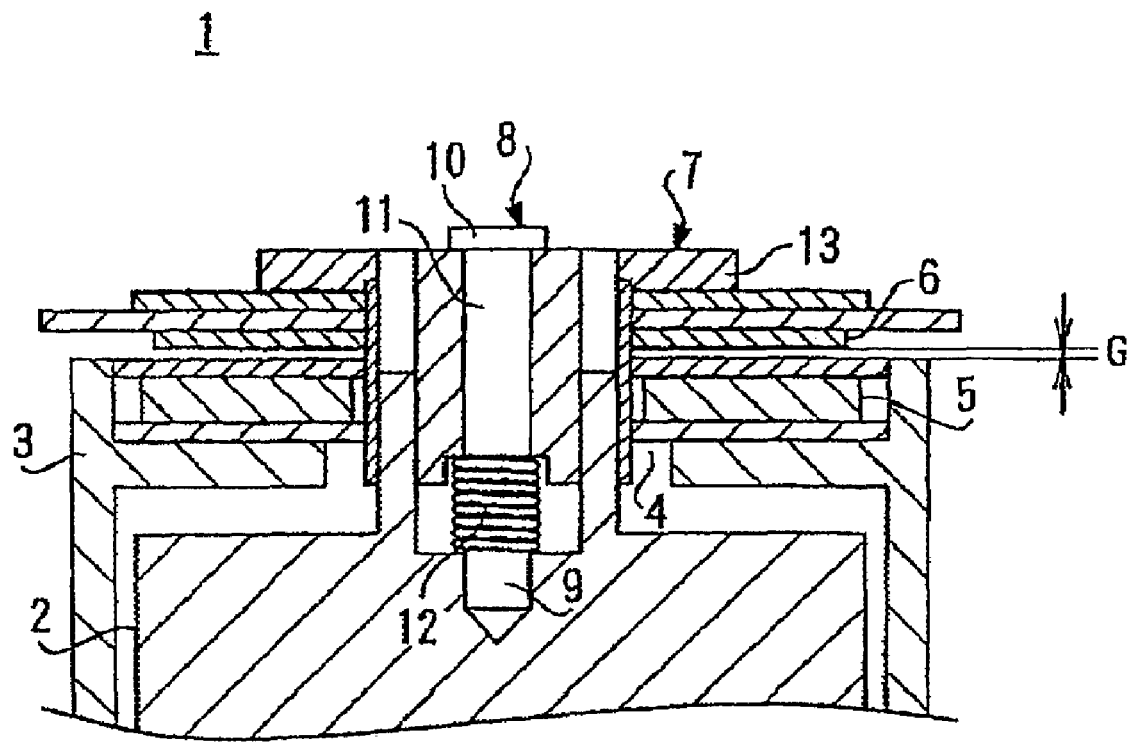
FIG. 1 is a principal-part cross-sectional drawing showing a conventional gap adjustable motor.
Figure 2:
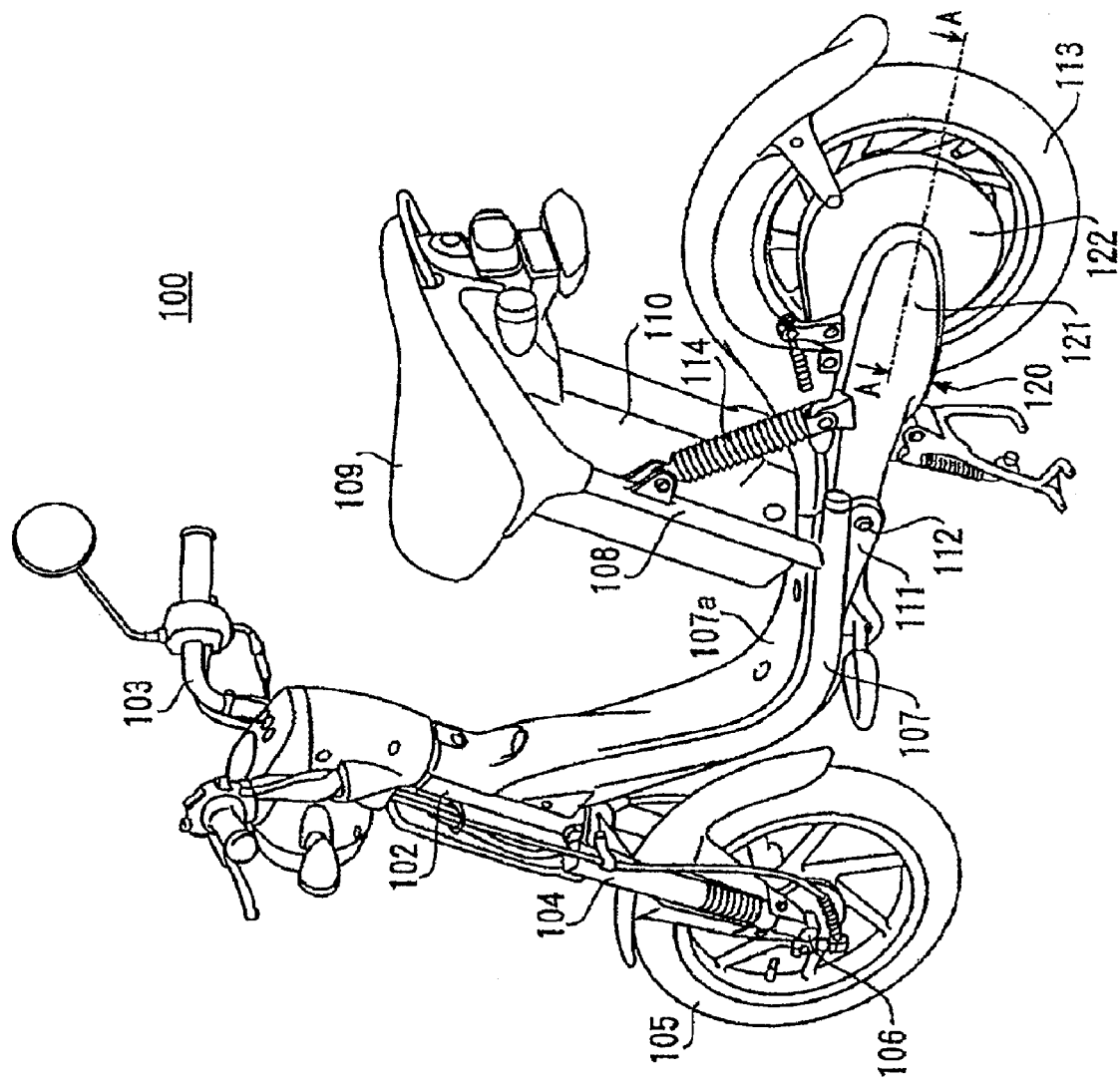
FIG. 2 is a side view of an electric two-wheeled vehicle as an example of the application of an electric rotating machine according to a first embodiment.

FIG. 2 is a side view of an electric two-wheeled vehicle to which an electric rotating machine according to a first embodiment is applied. Electric two-wheeled vehicle 100 shown in FIG. 2 has head tube 102 provided on the upper front part of its vehicle body, and a steering shaft (not shown) passes through the inside of this head tube 102 in a freely rotatable fashion. Handlebars 103 are attached to the top end of this steering shaft, and the upper parts of a pair of left and right front forks 104 are connected to the bottom end. Front wheel 105 is pivoted in a freely rotatable fashion at the bottom ends of these front forks 104 by a front wheel axle 106.

A pair of left and right vehicle body frames 107 extending toward the rear of the vehicle body are joined to head tube 102.

Vehicle body frames 107 have a round tubular shape, and after extending obliquely downward from head tube 102 toward the rear of the vehicle body, are curved in an arc shape toward the rear, and extend approximately horizontally toward the rear of the vehicle body. This approximately horizontal part forms step floor 107a.

At the rear ends of vehicle body frames 107, a pair of left and right seat pillars 108 are attached obliquely upward, supporting seat 109 with their top ends. Battery 110 is installed between these pair of left and right seat pillars 108. Furthermore, a pair of left and right rear arm brackets 111 (only one of which is shown) are welded to the rear ends of vehicle body frames 107. The front end of swing arm unit 120 is supported by these rear arm brackets 111 so as to swing freely up and down by a pivot shaft 112.

Rear wheel 113, which is a drive wheel, is pivoted in a freely rotatable fashion at the rear end of swing arm unit 120, and swing arm unit 120 is suspended from seat pillars 108 via rear cushion 114.

Swing arm unit 120 has its front end pivoted on pivot shaft 112, and has rear arm section 121 extending rearward, and approximately circular section 122 that is attached to the rear end of rear arm section 121 and supports rear wheel 113 at the side.

Circular section 122 houses thin axial gap type electric rotating machine (electric motor) 200 which is flat in the vehicle width direction.

Figure 3:
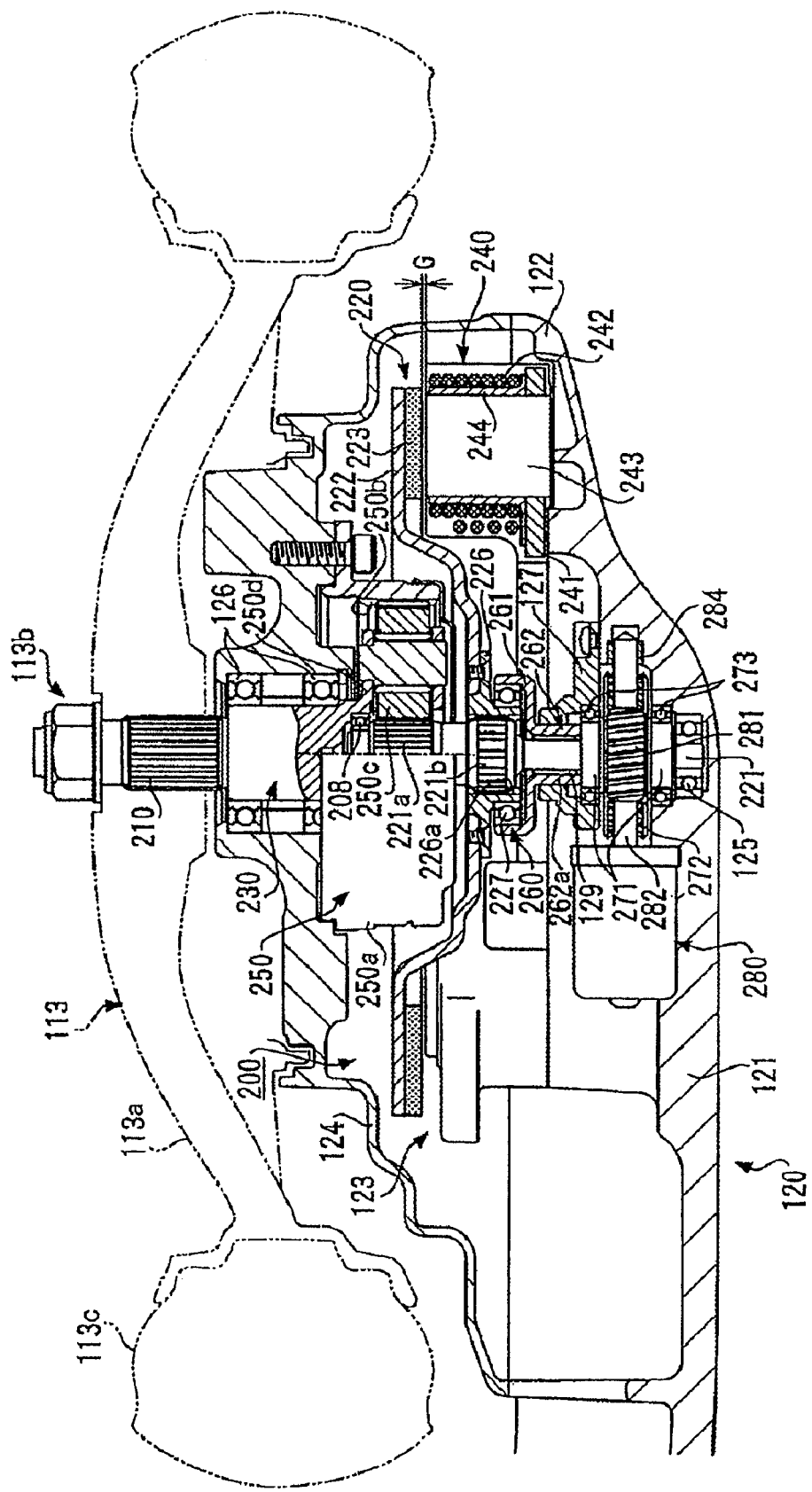
FIG. 3 is an A-A line cross-sectional drawing showing the principal parts of the electric rotating machine in the electric two-wheeled vehicle in FIG. 2.
Figure 4:
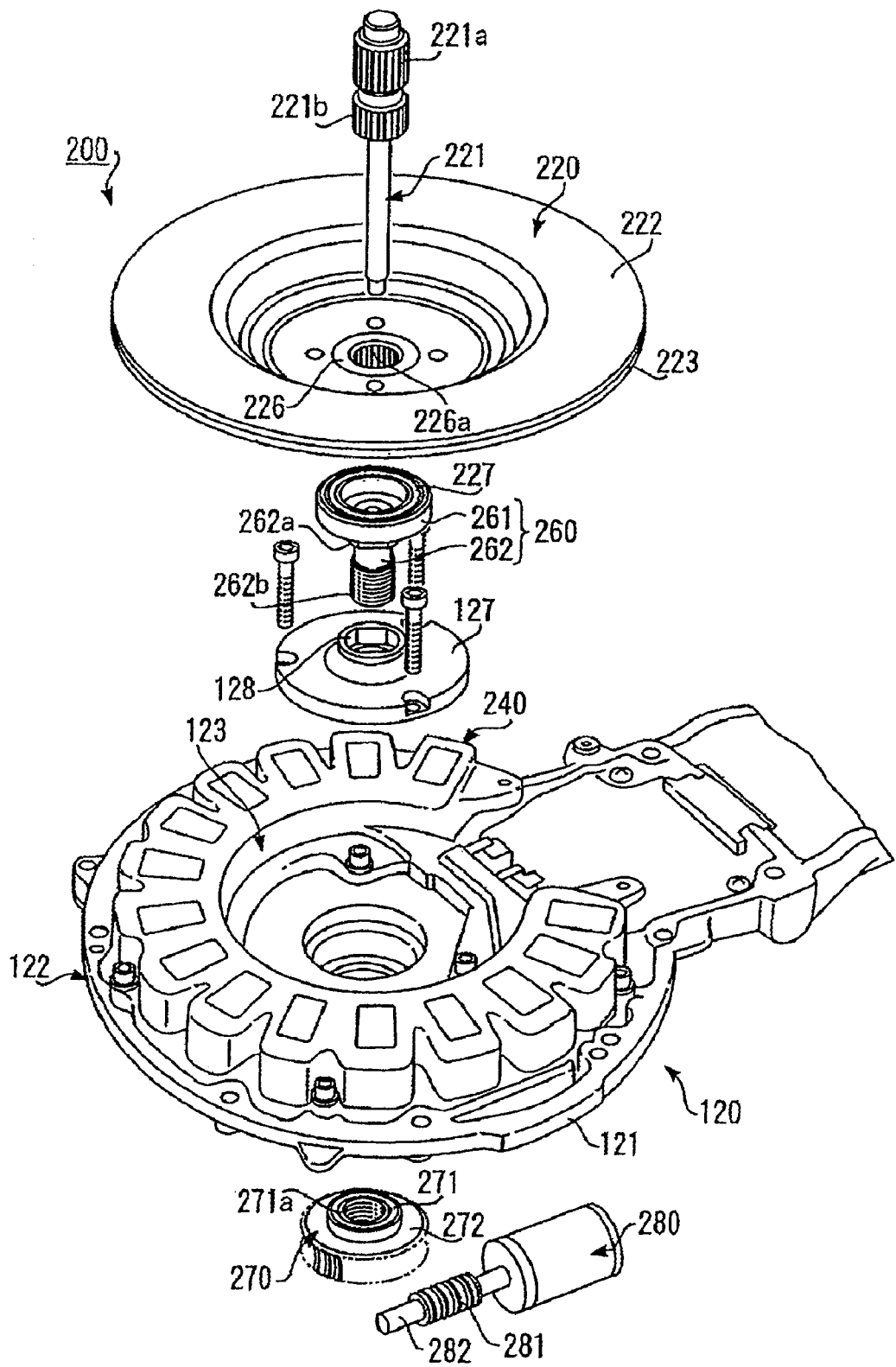
FIG. 4 is an exploded perspective drawing showing the principal parts of the electric rotating machine in the electric two-wheeled vehicle in FIG. 2.

FIG. 3 is an A-A line cross-sectional drawing in FIG. 2 showing the principal parts of electric rotating machine 200, and FIG. 4 is an exploded perspective drawing showing the principal parts of electric rotating machine 200 installed in swing arm unit 120. In FIG. 3, the top of the drawing corresponds to the right side of the vehicle body, and the left side of the drawing corresponds to the front.

By fitting cover 124 to the rear end of the arm housing (case) configuring the left side of rear arm section 121, housing 123 that houses electric rotating machine 200 is formed.

This housing 123 forms the rear end of swing arm unit 120—that is, the rear end of rear arm section 121—and circular section 122.

Bearing 125 is provided on the inner side of the center part of the bottom of housing 123, and bearings 126 are provided on the inner side of the center part of cover 124.

The bottom of housing 123 is located at the farthest position from rear wheel 113 in the vehicle width direction in swing arm unit 120.

These bearings 125 and 126 pivot in rotatable fashion rotating shaft 230 composed of axle shaft (output shaft) 210 that rotates the rear wheel and rotor shaft 221.

Wheel 113a is passed through by axle shaft 210, and secured integrally to axle shaft 210 with nut 113b from the outside.

By this, wheel 113a is supported in a rotatable fashion with respect to housing 123 and cover 124 together with axle shaft 210. Tire 113c is fitted to the outer periphery of wheel 113a.

As shown in FIG. 4, electric rotating machine (electric motor) 200 is mainly composed of stator 240 and rotor 220.

Stator 240 is housed in housing 123 and secured with bolts or the like. Stator 240 has circular shaped (approximately ring-shaped) stator yoke 241 and coils 242.

Coils 242 are wound via bobbins (insulators) 244 of a plurality of teeth 243 inserted and secured in a plurality of matching holes made in an approximately circular shape around axle shaft 210 in stator yoke 241. Coils 242, teeth 243 and stator yoke 241 are molded with resin or the like.

Rotor 220 is installed so as to be able to rotate around axle shaft 210 with respect to stator 240.

Rotor 220 rotates around rotor shaft 221 positioned at the center of rotation, and one end of this rotor shaft 221 (in the lower part of FIG. 3) is pivoted by bearing 204 fitted to housing 123 so as to be able to rotate freely and not to move in the axial direction.

The other end of rotor shaft 221 is supported so as to be able to rotate freely and not to move in the axial direction at the bottom of axle shaft 210 via bearing 208 shown in the center of FIG. 3.

The axle shaft 210 side end of rotor shaft 221 is inserted into speed reducer 250, and rotor shaft 221 is connected to axle shaft 210 via this speed reducer 250.

Speed reducer 250 reduces the rotation speed of rotor shaft 221, and transmits force to axle shaft 210.

This speed reducer 250 is housed inside cover 124, and has ring gear 250b fitted inside housing 250a that covers the periphery of the axle shaft side end of rotor shaft 221, sun gear 221a formed on the outer periphery of rotor shaft 221, planet gear 250c and supporting plate 250d.

Planet gear 250c is located between sun gear 221a and ring gear 250b, and rotates and revolves with the respective gears meshed.

Supporting plate 250d supports planet gear 250c, and is formed integrally at the bottom of axle shaft 210. The center of revolution of planet gear 250c and the center of rotation of rotor shaft 221 are on the same axis.

Rotor 220 is equipped with disk-shaped yoke 222. Yoke 222 is a member created by two-stage drawing of a metal plate made into a ring shape through punch processing.

On the outer periphery of one side of yoke 222, magnet 223 is fitted at a position facing stator 240. Magnet 223 is magnetized so that different polarities are formed alternately on one side of yoke 222.

Magnet 223 is positioned having gap G with respect to stator 240 in an axial direction of rotor shaft 221 (hereinafter referred to simply as "the axial direction.")

A through-hole through which rotor shaft 221 passes is formed in the center part of yoke 222. The upper part of bracket 226 connected in a freely rotatable fashion to movable member (slider) 260 via bearing 227 is fitted into this through-hole at the bottom.

Bracket 226 is formed in a tubular shape, and rotor shaft 221 passes through bracket 226 in a direction approximately orthogonal to stator 240, and is secured to yoke 222 via bolts at the upper part.

In the inner periphery of the lower part of bracket 226, slits 226a extending in the axial direction are formed, and these slits engage with projections 221b formed on the outer periphery of rotor shaft 221.

That is to say, bracket 226 and rotor shaft 221 are coupled by so-called serrations, and rotor shaft 221 is connected so as to be able to move in the axial direction with respect to bracket 226, with slits 226a as guide grooves.

Therefore, yoke 222 connected to bracket 226 can rotate together with rotor shaft 221, and can slide in the axial direction with respect to rotor shaft 221.

Cylindrical shaped movable member 260 through which rotor shaft 221 is passed internally is located on the lower part of this bracket 226—that is, on a part on the opposite side from rear wheel 113 with respect to bracket 226.

Movable member 260 is installed inside housing 123 so as to be freely rotated around rotor shaft 221, and is screwed to rotating member 270 at the lower part.

As shown in FIG. 3, movable member 260 has connecting section 261 provided on the upper part (front part)—that is, rear wheel 113 side part—to which the lower end of bracket 226 is connected via bearing 227, and main body section 262 extending downward from connecting section 261.

Connecting section 261 has a peripheral wall section rising upward from the outer periphery of a flange section extending radially from the front edge of main body section 262. In connecting section 261, a gap is provided from the top surface of the flange section, and rotor shaft 221 is passed through via the lower part of bearing 227 and bracket 226 fitted inside the peripheral wall section.

Main body section 262 is passed through by rotation-stopping member 127 fixed to housing 123. By this rotation-stopping member 127, rotation of main body section 262 itself is prevented, and movement is possible only in the axial direction.

The configuration of rotation-stopping member 127 will be described here. Through-hole 128 through which movable member 260 is passed is formed in rotation-stopping member 127. On the outer periphery of the front end (the upper part in FIG. 3) of main body section 262 of movable member 260 is provided with sliding section 262a that is fitted inside through-hole 128 and slides only in the axial direction along the inner surface of through-hole 128.

Sliding section 262a has a cross-sectionally cylindrical shape, and a flat part is formed by cutting away an outer periphery of a part thereof. On part of the inner peripheral surface of through-hole 128 fitted over this, a flat surface that is in contact with the flat surface of sliding section 262a is formed.

That is to say, by having these flat surfaces in contact, rotation-stopping member 127 and sliding section 262a of movable member 260 suppress relative rotation.

Figure 5A:
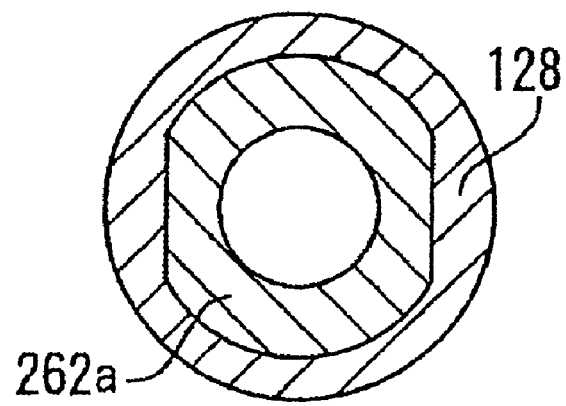
FIG. 5A is a cross-sectional drawing showing the relationship between a movable member and a rotation-stopping member.
Figure 5B:
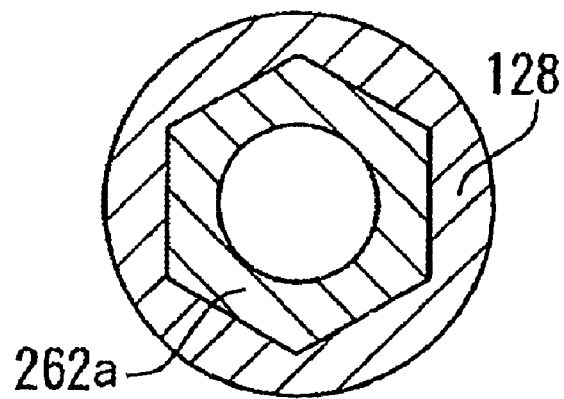
FIG. 5B is a cross-sectional drawing showing the relationship between a movable member and a rotation-stopping member.

FIG. 5A and FIG. 5B are cross-sectional drawings showing the relationship between a movable member and a rotation-stopping member. The axial-direction cross-sectional shape of the engaging parts of sliding section 262a of a movable member and rotation-stopping member 127 may, for example, have at least one part of a circular shape made a straight line as shown in FIG. 5A, or may be polygonal as shown in FIG. 5B.

The shapes of sliding section 262a and rotation-stopping member 127 need not be similar, but must mutually mesh and rotate relatively.

Externally threaded section 262b is formed on the base end (the lower end in FIG. 3) of main body section 262—that is, the outer periphery of the lower end of movable member 260—and this externally threaded section 262b is screwed into tapped (internally threaded) section 271a of rotating member 270.

Rotating member 270 has tubular cylindrical section 271 through which rotor shaft 221 is passed and into which the base end of movable member 260 is inserted, and worm wheel section 272 fitted so as to extend radially from the center of the outer periphery of cylindrical section 271.

Inside cylindrical section 271, main body section 262 of movable member 260 inserted into cylindrical section 271 is positioned. Tapped section 271a is formed on the inner peripheral surface of this cylindrical section 271, and externally threaded section 262b on the outer periphery of the lower end of main body section 262 is screwed into this tapped section 271a.

The connection of movable member 260 and rotating member 270 by the externally threaded section 262b and tapped section 271a may also be configured by using spiral (helical) projection and depression sections instead of externally threaded section 262b and tapped section 271a, and engaging these projection and depression sections.

It is also possible to provide a helical long hole on one of the lower ends of cylindrical section 271 and main body section 262, and a pin that fits into the long hole on the other.

That is to say, by the connecting structure of main body section 262 and cylindrical section 271—here, the screwing structure of tapped section 271a and externally threaded section 262b whose rotation is stopped by rotation-stopping member 127—rotation of rotating member 270 is converted to the axial direction. By this, movable member 260 moves in the axial direction.

Cylindrical section 271 is pivoted at the top and bottom in a rotatable fashion by bearings 273 fitted into housing 123 and rotation-stopping member 127.

Above rotor shaft 221, this cylindrical section 271 is located adjacent to bearing 125 into which one end of rotor shaft 221 is inserted.

Worm wheel section 272 is located adjacent to bearing 125 via bearing 273 fitted around the lower part of cylindrical section 271—that is, bearing 273 on the bearing 125 side. Worm 281 of adjustment motor 280 positioned orthogonal to rotating shaft 230 meshes with the gear on the outer periphery of this worm wheel section 272.

Adjustment motor 280 is a motor that adjusts the relative positions of rotor 220 and stator 240 in the rotating shaft axial direction (gap G), and, for example, is composed of an AC motor, stepping motor, or the like.

Adjustment motor 280 is fixed to the inside of housing 123 with bolts or the like, and is installed with output shaft 282 positioned approximately parallel to the lengthwise direction of rear arm section 121. That is to say, the axial direction of adjustment motor 280 lies in the lengthwise direction of swing arm unit 120, and output shaft 282 of adjustment motor 280 lies in the front-to-rear direction of the vehicle body.

The end of output shaft 282 of adjustment motor 280 is pivoted in housing 123 with oil retaining bearing 284, and worm 281 is formed on the outer periphery of this output shaft 282. Adjustment motor 280 is electrically connected to a drive circuit (not shown), whereby its drive is freely controlled.

A part of teeth 243 and coils 242 of stator 240 arranged in a circular shape is removed in housing 123 in which electric rotating machine 200 is installed. An electric circuit (not shown) is arranged in this removed part. Thus, in this part, the force that attracts magnet 223 is weakened.

For this reason, rotor 220 inclines with respect to rotor shaft 221, and force operates via bearing 227 so that movable member 260 is inclined with respect to rotor shaft 221.

In this case, friction (loss) increases in the serrated engaging section of bracket 226 and rotor shaft 221, and the sliding section of main body section 262 of movable member 260 and rotation-stopping member 127.

Also, friction (loss) increases in the sliding and rotating sections of the screwed parts of main body section 262 and cylindrical section 271 of rotating member 270. As a result of the increased friction between these parts, problems arise such as a need to increase the torque of adjustment motor 280, wear of the members, and so forth.

In this embodiment, these problems are prevented by the mechanism described below.

Namely, rotor shaft 221 is passed through by rotating member 270, and pivoted stably with bearing 125 of housing 123 and bearing 208 of axle shaft 210, and also cylindrical oil retaining bearing 129 is provided between the inner peripheral surface of main body section 262 and the outer peripheral surface of rotor shaft 221.

Specifically, oil retaining bearing 129 is fixed to the tip of the main body section—that is, close to bearing 227. Also, although not shown in the drawings, an oil retaining bearing is fixed to the base end of movable member 260—that is, the lower inner peripheral surface of main body section 262—inside lower bearing 273.

As the inner peripheral surface of oil retaining bearing 129 and the outer peripheral surface of rotor shaft 221 slide, inclination of movable member 260 and rotor 220 with respect to rotor shaft 221 is suppressed. It is thus possible to prevent increased friction and wear, as well as noise and vibration, in engaging sections of rotor shaft 221, bracket 226, main body section 262, rotation-stopping member 127 and cylindrical section 271 of rotating member 270.

The action of electric rotating machine 200 in swing arm unit 120 configured in this way will now be explained.

When the drive circuit (not shown) drives adjustment motor 280, output shaft 282—that is, worm 281—rotates. Rotating member 270 then rotates around rotor shaft 221 by meshing of worm 281 with the gear on the outer periphery of worm wheel section 272.

Cylindrical section 271 rotates due to this rotation, and since rotation of movable member 260 is prevented by rotation-stopping member 127, movable member 260 screwed into cylindrical section 271 at the bottom moves in the rear wheel 113 direction (upward in FIG. 3.) According to this configuration, the driving force of adjustment motor 280 is converted to axial direction displacement of movable member 260.

Through this movement of movable member 260 toward the rear wheel 113 side, connecting section 261 of movable member 260 applies force in a direction in which yoke 222 moves away from stator 240 via bracket 226 (upward in FIG. 3.) By this, yoke 222 moves in a direction in which yoke 222 moves away from stator 240.

Thus, the gap between magnet 223 of yoke 222 and stator 240—that is, gap G—widens. At this time, movable member 260 and yoke 222 are connected via bearing 227, and therefore yoke 222 can be moved while being rotated.

That is to say, it is possible to adjust gap G by the adjustment motor 280, and adjust the rotational torque and rotation speed of axle shaft (drive shaft) 210, while rotating axle shaft 210.

Conversely, when the drive circuit (not shown) rotates adjustment motor 280 in the direction opposite to the above described rotation direction, movable member 260 moves in a direction in which movable member 260 approaches rotating member 270 (downward in FIG. 3) by rotation of rotating member 270.

Then, associated with the operation of movable member 260, yoke 222 moves in a direction in which yoke 222 approaches stator 240 (downward in FIG. 3). Through this operation, gap G—the gap between magnet 223 of yoke 222 and stator 240—narrows.

At this time, also, since movable member 260 and yoke 222 are connected via bearing 227, yoke 222 can be moved while being rotated.

Thus, with electric rotating machine 200, the rotational torque and rotation speed of axle shaft 210 can easily be adjusted by the adjustment motor 280 control.

Also, housing 123 of swing arm unit 120 is located in the vehicle width direction with respect to rear wheel 113.

More specifically, housing 123 is located on the wheel 113a side of rear wheel 113, and electric rotating machine 200 is installed inside this housing 123.

Also, as shown in FIG. 2, swing arm unit 120 is shaped so as to have rear arm section 121 and circular section 122 connected to the rear end of rear arm section 121.

The rear end of this rear arm section 121 extends to the outer surface of the opposite side from rear wheel 113 with respect to circular section 122—that is, the center part of the left side of the vehicle. The rear end of this rear arm section 121 is formed by the bottom of housing 123.

Therefore, adjustment motor 280 located at the bottom of housing 123 is positioned in the front-to-rear direction of the vehicle within the arm section swelling sideways in swing arm unit 120.

As a result, swing arm unit 120, when viewed from the left side of the vehicle, presents a clean appearance without projection corresponding to adjustment motor 280.

Electric rotating machine 200 has rotor 220 and stator 240 whose relative positions (gap G) can be changed, and output characteristics can easily be changed according to the running state, even when the vehicle is running, by a gap adjustment mechanism provided for these. That is to say, according to electric two-wheeled vehicle 100 of this embodiment, the relative positions of rotor 220 and stator 240 (gap G) can be controlled so that optimal attraction and repulsion for obtaining desired torque and rotation speed can be generated in accordance with a running state that changes constantly during driving.

Specifically, when large torque necessary for starting is necessary, gap G between rotor 220 and stator 240 is made smaller by performing drive control of adjustment motor 280. As a result of gap G becoming smaller, a large amount of attraction and repulsion is generated between rotor 220 and stator 240.

On the other hand, when a high rotation speed of rotating shaft 230 is necessary, gap G between rotor 220 and stator 240 is made larger by performing drive control of adjustment motor 280. As a result of gap G becoming larger, a small amount of attraction and repulsion is generated between rotor 220 and stator 240, and the rotation speed, which is inversely proportional thereto, can be increased.

Also, in this embodiment, gap G between rotor 220 and stator 240 is adjusted by moving rotor 220. Therefore, a smaller motor can be used for adjustment motor 280 than when heavy stator 240 composed of an iron core and copper wire is moved.

Furthermore, as significant vibrations and impact loads are exerted on electric rotating machine 200 installed in electric two-wheeled vehicle 100, it is necessary for heavy stator 240 to withstand large loads.

If stator 240 were moved, it would not be possible to secure housing 123 and so forth securely with bolts. Moreover, it would be necessary to make a mechanism capable of preventing the rotation of stator 240 and also allowing axial movement and a structure capable of withstanding large loads compatible. Thus, a mechanism supporting stator 240 in a freely movable fashion would be large and heavy, but this is not necessary in this electric two-wheeled vehicle 100.

Rotor 220 moves in the axial direction together with movable member 260 that moves in the axial direction by rotation of rotating member 270 rotated by adjustment motor 280. By this, it is possible to easily and reliably adjust gap G between rotor 220 and stator 240 by adjustment motor 280 control.

By adjusting gap G between rotor 220 and stator 240 in this way, it is possible to actively adjust the relative positions of the two (gap G). Therefore, by generating a large amount of attraction and repulsion when high torque is necessary, and generating a small amount of attraction and repulsion when fast rotation is necessary, it is possible to freely change output characteristics.

As long as an axial gap type electric rotating machine is concerned, gap G between the rotor and stator can be adjusted by a configuration including movable member 260, rotating member 270 and adjustment motor 280.

If a radial gap type is used instead of an axial gap type, the facing areas of the rotor and stator can be adjusted with a similar configuration.

If a type that has a conical gap is used instead of an axial gap type, the gap and facing areas of the rotor and stator can be adjusted.

As it is only necessary for rotating member 270 to be rotated by rotation of adjustment motor 280, there are no restrictions on the type, shape, or location of the motor, and therefore a low-cost motor can be selected, and a separate layout using a pulley or the like is also possible, thereby making the overall configuration compact.

Furthermore, according to this embodiment, since adjustment motor 280 and rotating member 270 are connected via worm 281 and worm wheel section 272, it is possible to freely rotate rotating member 270 around rotating shaft 230 by rotation of adjustment motor 280. Adjustment motor 280 can be made smaller and more efficient by reducing the rotation speed of worm 281.

Movable member 260 displaces rotation of rotating member 270 in the rotating shaft 230 direction via main body section 262, and moves rotor 220 in the rotating shaft 230 direction via connecting section 261.

Therefore, gap G between rotor 220 and stator 240 can be adjusted by reliably controlling the amount of movement of movable member 260 by relative rotation of rotating member 270 and movable member 260. Examples of a state in which relative movement is possible spirally include skewed—for example, serration engaging of helical teeth, and engaging of a pin with a spiral long hole.

The connecting parts of rotating member 270 and movable member 260 can be made using an inexpensive process. Moreover, it is possible to decrease the amount of movement of movable member 260 per number of revolutions of rotating member 270 and perform more precise control.

As rotating shaft 230 and rotor 220 move relatively in the rotating shaft 230 direction and rotate integrally in the rotation direction, torque is transmitted and only rotor 220 moves in accordance with axial-direction movement of movable member 260. As a result, compared to a case in which rear wheel 113 connected to rotating shaft 230 is moved, the weight and sliding loss of the object to be moved can be reduced, and efficiency can be improved. In addition, instability of rotor 220 movement can be prevented.

Rotating shaft 230 is pivoted stably inside housing 123 by bearings 125, 126 and 208. As a result, rotating shaft 230 is stable, and vibration and noise are reduced. In addition, movable member 260 and rotating member 270 are supported in a stably operable fashion, and friction of sliding parts during operation is reduced.

According to electric two-wheeled vehicle 100 of this embodiment, since electric rotating machine 200 is used as a driving source, electric two-wheeled vehicle 100 whose drive characteristics can be freely adjusted is provided.

As adjustment motor 280 can be positioned orthogonal to rotating shaft 230, the electric rotating machine itself can be prevented from getting longer in the rotating shaft 230 direction. That is to say, the overall electric rotating machine 200 can be made smaller in the vehicle width direction.

Furthermore, as electric rotating machine 200 is housed in housing 123 with rotating shaft 230 as the axle shaft, and adjustment motor 280 is positioned with its output shaft lying in the vehicle front-to-rear direction, housing 123 is slim. That is to say, swing arm unit 120 itself is of in-hub type, and is formed compactly and slimly.

Figure 6:
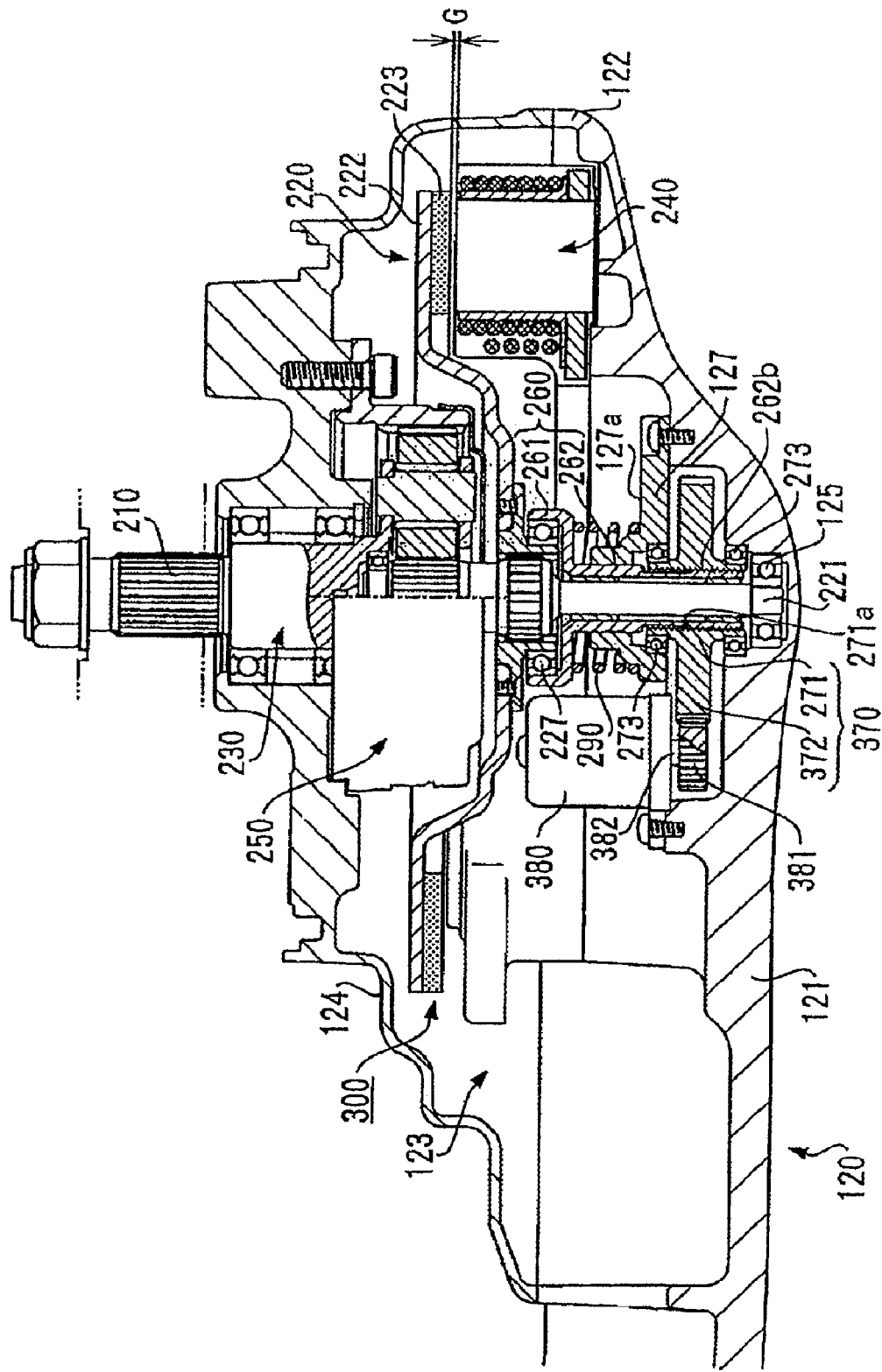
FIG. 6 is a cross-sectional drawing showing the principal parts of an electric rotating machine according to a second embodiment.

FIG. 6 is a cross-sectional drawing showing the principal parts of a second embodiment of an electric rotating machine. Electric rotating machine 300 shown in FIG. 6 is installed inside the housing of the swing arm unit instead of electric rotating machine 200 in the electric vehicle shown in FIG. 2.

Referring to FIG. 2, FIG. 6 corresponds to the A-A line cross-sectional drawing in FIG. 2 in the same way as for the parts shown in FIG. 3. Components in Embodiment 1, or components having equivalent functions, are assigned the same reference numerals in FIG. 6, and only points of difference are described here.

As with electric rotating machine 200, by an adjustment mechanism that adjusts the relative positions of rotor 220 and stator 240 (gap G), electric rotating machine 300 shown in FIG. 6 can easily change output characteristics according to the running state, even while the vehicle is running. As compared with electric rotating machine 200, electric rotating machine 300 has an identical configuration except for the configuration of the rotating member, the position of the adjustment motor and springs.

That is to say, together with adjustment motor 380 and rotating member 370, electric rotating machine 300 shown in FIG. 6 has rotating shaft 230, speed reducer 250, rotor 220, stator 240, movable member 260, and so forth, configured in the same way, and arranged in the same way, as in electric rotating machine 200. Rotating shaft 230 is composed of axle shaft 210 and rotor shaft 221.

In electric rotating machine 300, the orientation of adjustment motor 380 located inside housing 123 is parallel to rotating shaft 230, and the driving force of this adjustment motor 380 is transmitted to movable member 260 via rotating member 370.

More specifically, rotating member 370 of electric rotating machine 300 has tubular cylindrical section 271 through which rotor shaft 221 is passed and into which the base end of movable member 260 is inserted, and flat gear section 372 fitted so as to extend radially from the center of the outer periphery of cylindrical section 271.

Cylindrical section 271 has a similar configuration to cylindrical section 271 of the first embodiment, and is connected to main body section 262 of movable member 260 by a screw (helical) structure in the same way as in the first embodiment. Thus, rotation of rotating member 370 is converted to the axial direction by a movable member 260 whose own rotation is prevented by rotation-stopping member 127.

Through this movement in the axial direction of movable member 260 itself, yoke 222 moves, and adjusts gap G between magnet 223 of rotor 220 and stator 240.

Above rotor shaft 221, cylindrical section 271 of rotating member 370 is located adjacent to bearing 125 into which one end of rotor shaft 221 is inserted.

Flat gear section 372 is located adjacent to bearing 125 via bearing 273 fitted around the lower part of cylindrical section 271—that is, bearing 273 on the bearing 125 side. This flat gear section 372 meshes with flat gear 381 of adjustment motor 380.

Adjustment motor 380 is an adjustment motor that adjusts the relative positions in the rotating shaft axial direction of rotor 220 and stator 240 (gap G), as in Embodiment 1.

Adjustment motor 380 is fixed to the inside of housing 123 with bolts or the like, with an output shaft 382 parallel to rotating shaft 230.

Electric rotating machine 300 has a compression spring (energization member) 290 that applies force movable member 260 in a direction in which the rotating shaft 230 direction force applied to movable member 260 by magnetic attraction generated between rotor 220 and stator 240 is counteracted.

Compression spring 290 is located between movable member 260 fitted to the outside of rotor shaft 221, and rotation-stopping member 127 which is fixed inside housing 123 and through which rotor shaft 221 and movable member 260 pass.

More specifically, compression spring 290 is installed around main body section 262 of movable member 260. One end of this compression spring (the upper end in FIG. 6) is in contact with the rear surface of the flange section of connecting section 261, and the other end (the lower end in FIG. 6) is in contact with flat surface section 127a of rotation-stopping member 127 located facing and at a predetermined distance from the flange section.

By this, force is applied to movable member 260 in a direction in which movable member 260 moves away from rotating member 370, and via the force applied movable member 260, force is applied to rotor 220 in a direction in which rotor 220 moves away from stator 240.

According to this configuration, since compression spring 290 counteracts the force applied to movable member 260 by magnetic attraction generated between rotor 220 and stator 240, the force necessary to move movable member 260 in opposition to magnetic attraction by adjustment motor 380, rotating member 370, and so forth, can be reduced.

Furthermore, friction of the contact areas between movable member 260 and rotating member 370—that is, the screwed parts of externally threaded section 262b and tapped section 271a—can be reduced, and driving by small adjustment motor 380 becomes possible. Therefore, the size and power consumption of the adjustment motor can be reduced. This provides a compact and highly efficient electric rotating machine.

In this embodiment, a configuration has been described in which compression spring 290 is located between movable member 260 and rotation-stopping member 127, but this is by no means limiting, and compression spring 290 may be located in any position in which it counteracts the magnetic attraction generated between rotor 220 and stator 240.

In electric rotating machine 300 of this embodiment, compression spring 290 is used, but this is by no means limiting, and any kind of member may be used as an energization member, such as a rubber, sponge, or suchlike elastic member, as long as it applies force to movable member 260 in a direction in which the rotating shaft 230 direction force applied to movable member 260 by magnetic attraction generated between rotor 220 and stator 240 is counteracted.

If compression spring 290 in this electric rotating machine 300 is provided in electric rotating machine 200, the same kind of operational effect can be obtained in electric rotating machine 200 as obtained by a compression spring 290 in electric rotating machine 300.

Other operational effects of electric rotating machine 300 of the second embodiment and an electric two-wheeled vehicle equipped with electric rotating machine 300 are approximately the same as in the first embodiment, and therefore a description thereof is omitted here.

According to this embodiment, since rotating member 370 and adjustment motor 380 are connected via flat gear 381 and flat gear section 372, rotating member 370 can be freely rotated around the rotating shaft by rotation of adjustment motor 380. Also, the torque of adjustment motor 380 necessary for moving rotor 220 can be decreased by speed reduction according to the number of teeth of each, thereby achieving downsizing and high efficiency of adjustment motor 380.

Figure 7:
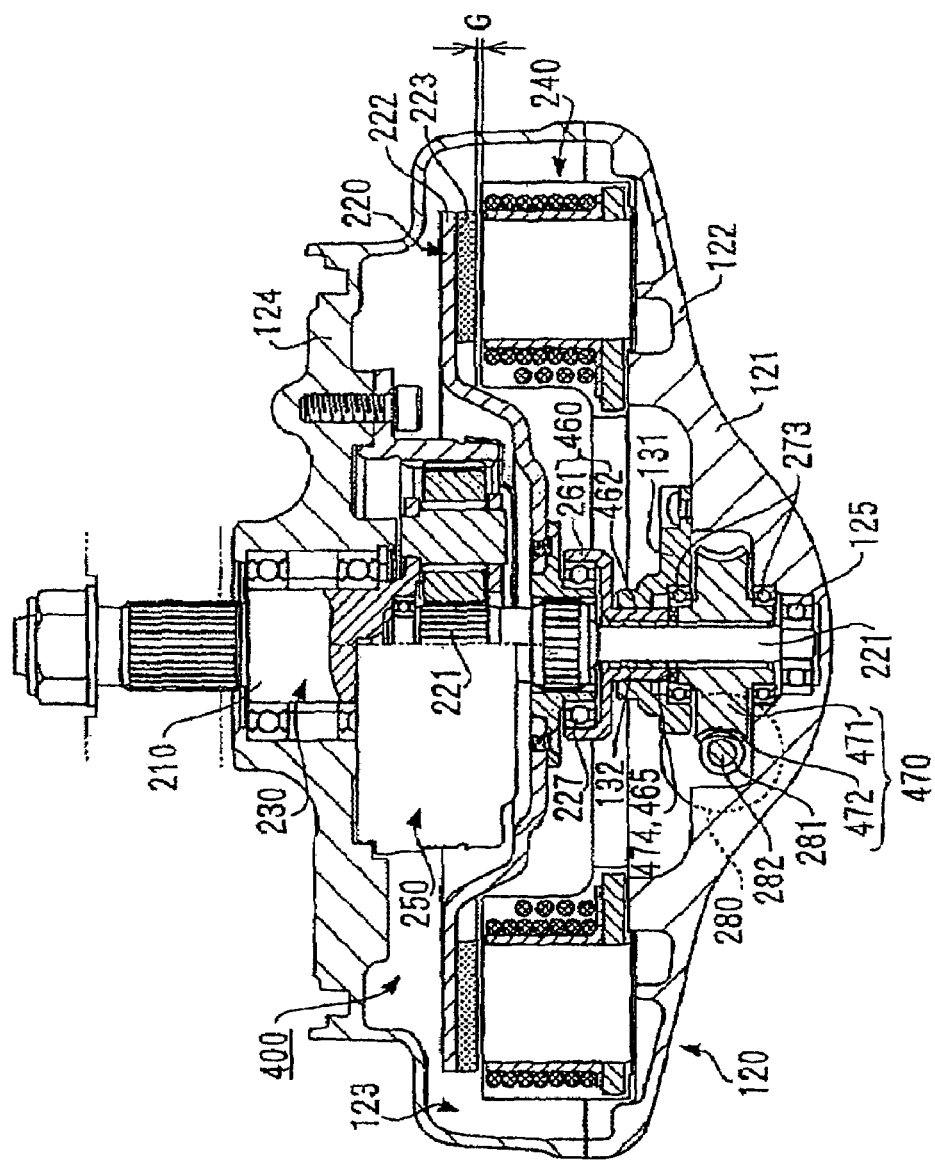
FIG. 7 is a cross-sectional drawing showing the principal configuration of an electric rotating machine according to a third embodiment.

FIG. 7 is a cross-sectional drawing showing the principal configuration of an electric rotating machine according to a third embodiment. In the same way as electric rotating machine 200 in FIG. 3 and electric rotating machine 300 in FIG. 6, by a mechanism that adjusts gap G between rotor 220 and stator 240, electric rotating machine 400 of the third embodiment shown in FIG. 7 can easily change output characteristics according to the running state, even while the vehicle is running. As compared with electric rotating machine 200 shown in FIG. 3, electric rotating machine 400 differs only in the configuration of the movable member and rotating member, and the rest of the configuration is similar. Therefore, components in the first embodiment, or components having equivalent functions, are assigned the same reference numerals in FIG. 7, and only points of difference are described here.

As with the components of electric rotating machine 200, electric rotating machine 400 is housed in housing 123 forming the swing arm unit of an electric two-wheeled vehicle. FIG. 7 shows a vertical cross-section of the circular section constituting the rear end of the swing arm unit, viewed from the rear of the vehicle.

Together with a movable member 460 and rotating member 470, electric rotating machine 400 has rotating shaft 230, rotor shaft 221, speed reducer 250, rotor 220, stator 240, adjustment motor 280, and so forth, configured and arranged in the same way as in electric rotating machine 200. Rotating shaft 230 is composed of axle shaft 210 and rotor shaft 221.

In particular, adjustment motor 280, as in the case of adjustment motor 280 of electric rotating machine 200 (see FIG. 3), is a motor that adjusts the relative positions in the rotating shaft axial direction of rotor 220 and stator 240 (gap G), and, for example, is composed of an AC motor, stepping motor, or the like.

This adjustment motor 280 is fixed to the inside of housing 123 with bolts or the like, and is installed with output shaft 282 positioned approximately parallel to the lengthwise direction of rear arm section 121. That is to say, the axial direction of adjustment motor 280 lies in the lengthwise direction of swing arm unit 120, and output shaft 282 of adjustment motor 280 lies in the front-to-rear direction of the vehicle body.

As in electric rotating machine 200, the end of this output shaft 282 is pivoted in housing 123 by an oil retaining bearing (not shown), and worm 281 is formed on the outer periphery of this output shaft 282. Adjustment motor 280 is electrically connected to a drive circuit (not shown), whereby its drive is freely controlled.

Movable member 460 of electric rotating machine 400 shown in FIG. 7 is located in the same way as movable member 260 of the first embodiment, and has a similar function. That is to say, movable member 460 is provided on the inside of rear wheel 113, and has connecting section 261 to which the lower end of bracket 226 is connected via bearing 227, and tubular main body section 462 extending downward from connecting section 261.

Connecting section 261 has a similar configuration to connecting section 261 of movable member 260 of the first embodiment, and therefore a description thereof is omitted here.

Main body section 462 is passed through by a rotation-stopping member 131 fixed to housing 123. By this rotation-stopping member 131, rotation of main body section 462 itself is prevented, and movement is possible only in an axial direction.

Rotation-stopping member 131 differs from rotation-stopping member 127 according to Embodiment 1 only in the size of the through-hole, and the rest of the configuration is the same.

Rotor shaft 221 passes in a freely rotatable fashion through the inside of main body section 462 via oil retaining bearing 132.

The bottom surface of main body section 462—that is, end face 465 facing rotating member 470—is in contact with rotating member 470, and is formed so that main body section 462 can move in the axial direction by rotation of rotating member 470.

Figure 8A:
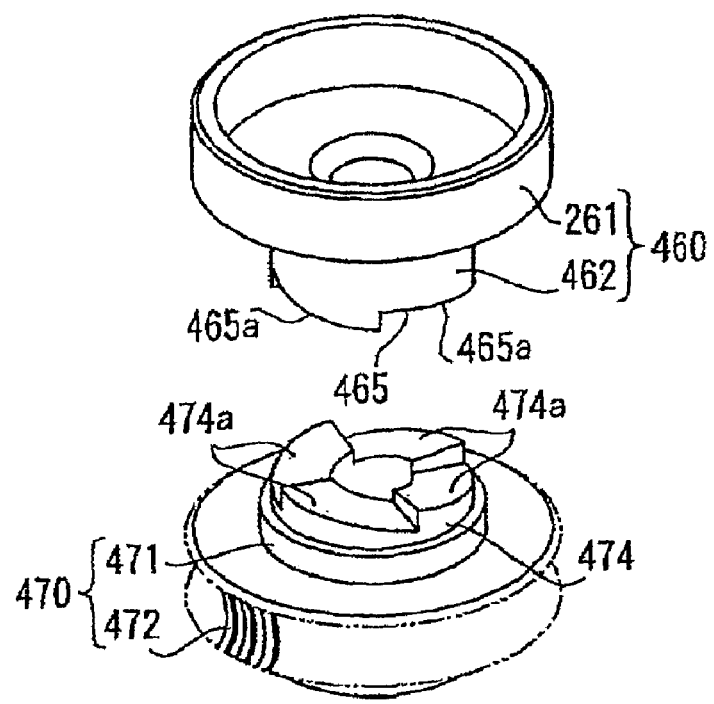
FIG. 8A is a perspective drawing showing an example of the movable member and rotating member according to the third embodiment.
Figure 8B:
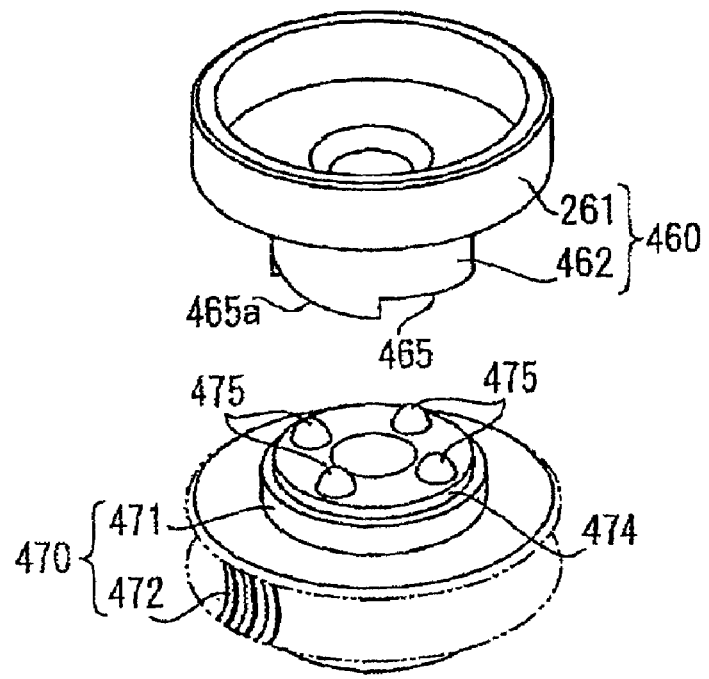
FIG. 8B is a perspective drawing showing an example of the movable member and rotating member according to the third embodiment.

FIG. 8A and FIG. 8B are perspective drawings showing examples of the configuration of a movable member and rotating member of the third embodiment.

In the example in FIG. 8A, main body section 462 and end face 465 have inclined faces 465a inclined from the perpendicular plane on rotor shaft 221.

These inclined faces 465a are formed on the surface of a projecting wall section that projects downward from the periphery of the center hole through which connected rotor shaft 221 is passed.

These inclined faces 465a are in contact with contacting areas (hereinafter referred to as "sliding faces") 474a provided on the surface of rotating member 470—that is, the end on the movable member 460 side.

As shown in FIG. 7 and FIG. 8A, rotating member 470 has a tubular cylindrical section 471 through which rotor shaft 221 is passed, leaving a gap, and worm wheel section 472 fitted so as to extend radially from the center of the outer periphery of cylindrical section 471.

Worm wheel section 472 has a gear formed on its outer periphery, in the same way as worm wheel section 272 of Embodiment 1. This gear meshes with worm 281 of adjustment motor 280 positioned orthogonal to rotating shaft 230, and rotates rotating member 470 through the drive of adjustment motor 280.

As shown in FIG. 8A, sliding faces (contacting areas) 474a that slide while in contact with inclined faces 465a are formed on the top of cylindrical section 471—that is, the end facing movable member 460.

These sliding faces (contacting areas) 474a here form parts of end face 474 facing movable member 460 in cylindrical section 471, and are inclined faces inclined from the perpendicular plane on rotor shaft 221.

That is to say, in this embodiment, end face 465 of movable member 460 (to be precise, inclined faces 465a of end face 465) and end face 474 of rotating member 470 are formed as mutually the same shapes, and is shaped so as to correspond with each other in the rotor shaft 221 direction.

By this, when rotating member 470 rotates in one direction around rotor shaft 221, sliding faces (contacting areas) 474a of end face 474 slide along inclined faces 465a, and move movable member 460 itself in a direction in which movable member 460 moves away from rotating member 470. This operation occurs because movable member 460 is fixed around rotor shaft 221 by rotation-stopping member 131.

When rotating member 470 rotates around rotor shaft 221 in the opposite direction, inclined sliding faces 474a slide along inclined faces 465a. At this time, sliding faces 474a move in a direction in which sliding faces 474a move away from inclined faces 465a, but inclined faces 465a are formed integrally with magnet 223.

Therefore, by attraction (an attractive magnetic force) generated by magnet 223 and stator 240, inclined faces 465a are maintained in a state of contact with sliding faces 474a. Thus, movable member 460 itself is moved in a direction in which movable member 460 approaches rotating member 470.

As these inclined faces 465a and sliding faces 474a form engaging sections that are in mutual contact in this way, the driving force of adjustment motor 280 is converted from the torque of worm wheel section 472 to an axial direction force, and moves movable member 460 in the axial direction.

Thus, inclined faces 465a and sliding faces 474a displace the rotational direction of rotating member 470 and move movable member 460 itself in the rotor shaft 221 direction. Through this movement of movable member 460 itself, gap G with respect to stator 240 can be adjusted with rotor 220 faced with stator 240.

The engaging relationship of movable member 460 and rotating member 470 is independent of the engaging of sliding faces, and any kind of configuration may be used as long as the rotational direction of rotating member 470 is displaced and movable member 460 is moved in the axial direction.

For example, as shown in FIG. 8B, it is possible to form inclined faces 465a only on the bottom surface of movable member 460 (to be precise, end face 465), and to form projections 475 that slide across inclined faces 465a on end face 474 which is the top surface of cylindrical section 471 of rotating member 470.

In an Embodiment 3 configured in this way, when adjustment motor 280 is driven by a drive circuit (not shown), output shaft 282—that is, worm 281—rotates. Then rotating member 470 rotates through the meshing of worm 281 and worm wheel section 472.

Cylindrical section 471 then rotates around rotating shaft 230 (to be precise, rotor shaft 221.) As cylindrical section 471 rotates, end face 474 slides along end face 465 which is the sliding face.

Through this operation, force operates that is applied to movable member 460 toward the rear wheel 113 side (upward in FIG. 7.) Movable member 460 then moves toward the rear wheel 113 side (upward in FIG. 7,) and together with this, yoke 222 also moves toward the rear wheel 113 side.

Therefore, gap G between stator 240 and rotor 220 widens. At this time, movable member 260 and yoke 222 are connected via bearing 227. Consequently, rotor 220—to be precise, yoke 222 together with rotor shaft 221—can be moved while being rotated.

Conversely, when the drive circuit (not shown) rotates the adjustment motor (omitted from the drawing) in the direction opposite to the previous rotation direction, end face 474 of rotating member 470 and end face (sliding face) 465 at the lower end of main body section 462 rotate relatively around rotating shaft 230 (to be precise, rotor shaft 221) while sliding.

By the magnetic attraction operating between rotor 220 and stator 240, movable member 460 moves downward in the drawing, and yoke 222 also moves downward together with this. Therefore, gap G between stator 240 and magnet 223 of rotor 220 narrows.

At this time, also, movable member 460 and yoke 222 are connected via bearing 227, and therefore rotor 220—to be precise, yoke 222 together with rotor shaft 221—can be moved while being rotated.

According to this embodiment, movable member 460 and rotating member 470 are contacted by end face 465—to be precise, inclined faces 465a and sliding faces 474a contacting these inclined faces 465a in the rotating shaft axial direction—and movable member 460 prevents rotation of the movable section itself by rotation-stopping member 131. Consequently, by rotation of rotating member 470, rotating member 470 and movable member 460 rotate relatively, force is applied by rotating member 470 via inclined faces 465a and sliding faces 474a, and movable member 460 moves in the rotating shaft 230 direction. By this, the relative positions of rotor 220 and stator 240 can be controlled easily and accurately.

As the output shaft of adjustment motor 280 is positioned approximately orthogonal to rotating shaft 230, adjustment motor 280 does not project in the axial direction of electric rotating machine 400 in electric rotating machine 400 itself. As a result, the length of electric rotating machine 400 itself in the rotating shaft axial direction can be shortened. That is to say, as adjustment motor 280 is orthogonal to rotating shaft 230 in the swing arm unit in which rotating shaft 230 is provided as axle shaft 210 that rotates a drive wheel of an electric vehicle, electric rotating machine 400 has a compact and slim configuration. The vehicle width of a vehicle equipped with this swing arm unit is also small.

A spring may also be installed so as to apply force to rotor 220 or movable member 460 on the side opposite the direction in which force is applied to rotor 220 by rotation of rotating member 470. By this, the rotating member and movable member can be reliably in contact.

It is also possible to omit a spring by setting the force applied by rotation of rotating member 470 so as to counteract the magnetic attraction between rotor 220 and stator 240. Also, there may be one inclined face 465a, or a plurality of inclined faces 465a.

The cross-sectional shapes of movable member 460 and rotation-stopping member 131 may be fitting with part of a circular shape made a straight line, may be fitting in a polygonal shape, may be fitting in an odd shape other than a circular shape, and need not contact around the entire periphery.

With regard to the connectional relationship between the movable member and rotor via a bracket in the above described embodiments, both may be completely fixed, they may be fitted with a degree of space, or they may simply be in contact.

The movable member may be fully connected, or not fully connected, to the rotor, as long as movement of the rotor toward the stator side by magnetic attraction can be prevented. For example, a configuration may be used whereby the movable member is in contact in the direction opposite to magnetic attraction and the rotor is pushed.

Also, if the movable member is located on the side in which the rotor is pulled in opposition to magnetic attraction, the rotor can be pulled through contact with the movable member in a similar way, and the rotor can be moved to a predetermined position by magnetic attraction.

In the above embodiments, an electric rotating machine has been described as a drive motor, but this is by no means limiting, and an electric rotating machine may also be a generator, or may be an apparatus used as both a motor and a generator, such as a regenerative brake in an electric vehicle.

Also, in these embodiments, a configuration has been assumed in which magnet 223 is located on the rotor 220 side, but this is by no means limiting, and a configuration may also be used in which a magnet is located on the stator 240 side, and a coil is located on the rotor 220 side.

An electric rotating machine according to one embodiment employs a configuration that includes: a rotating shaft; a rotor connected to the rotating shaft; a stator located facing the rotor; and an adjustment section that adjusts relative positions of the rotor and the stator in the rotating shaft axial direction; wherein the adjustment section has: an adjustment motor; a rotating member that is connected to the adjustment motor and rotates around the rotating shaft by rotation of the adjustment motor; and a movable member that moves in the rotating shaft axial direction by rotation of the rotating member, and moves the rotor in the rotating shaft axial direction.

According to the above described configuration, the rotating member rotates around the rotating shaft by rotation of the adjustment motor, and by rotation of this rotating member, the movable member moves in the rotating shaft axial direction and moves the rotor, and changes its relative position (gap) with respect to the stator. Thus, even when the rotor is rotating, it is possible to adjust the gap between the rotor and stator—in other words, to actively adjust the relative positions of the rotor and stator—and by increasing attraction and repulsion generated between the two when high torque is necessary, and decreasing attraction and repulsion generated between the two when fast rotation is necessary, output characteristics can be freely changed.

Also, if an electric rotating machine with the above described configuration is, for example, an axial gap type electric rotating machine, it is possible to adjust the gap between the rotor and stator. Furthermore, if an electric rotating machine with the above described configuration is an electric rotating machine of other than axial gap type—for example, a radial gap type electric rotating machine which is an electric rotating machine that has a conical gap in opposed areas of the rotor and stator, or the like—it can have a similar effect by adjusting the gap between the rotor and stator and the opposed areas, respectively.

Also, according to an electric rotating machine with the above described configuration, since it is only necessary to rotate the rotating member by rotation of the adjustment motor, there are no restrictions on the type, shape, or location of the adjustment motor that adjusts the gap between the rotor and stator. Thus, in an electric rotating machine, a low-cost motor can be selected as the adjustment motor, and furthermore, a separate layout using a pulley or the like is also possible, thereby making the overall configuration compact.

Furthermore, with an electric rotating machine with the above described configuration, since the rotor is moved with respect to the stator by a movable member, a lower-torque adjustment motor can be used than when a heavy stator composed of an iron core and copper wire is moved.

Generally, when an electric rotating machine is used for an electric vehicle or the like, significant vibrations and impact loads are exerted on the electric rotating machine itself, and therefore it is necessary for the heavy stator to have a configuration that can withstand large loads. With this configuration, if the stator is moved, it is difficult to secure it to the case, etc., with bolts. In addition, a mechanism is necessary that prevents stator rotation while allowing movement in an axial direction, and the structure that can withstand large loads is necessary so that the apparatus becomes structurally large and heavy.

In contrast, according to the above described configuration of an electric rotating machine of the present invention, since the rotor is moved, these large and heavy structures are unnecessary.

An electric rotating machine according to another embodiment employs a configuration wherein, in the above configuration, with regard to the rotating member, the driving force of the adjustment motor is transmitted by an output gear section provided on an output shaft of the adjustment motor and a gear section that is provided on the outer periphery of the rotating member and meshes with the output gear section.

According to this configuration, since the rotating member and adjustment motor are connected via a main gear and a gear section, the rotating member can be freely rotated around the rotating shaft by rotation of the adjustment motor. Also, the torque of the adjustment motor necessary for moving the rotor can be decreased through speed reduction according to the number of teeth, and the adjustment motor can be made smaller and more efficient.

An electric rotating machine according to another embodiment employs a configuration wherein, in an above configuration, the rotating member is connected to the adjustment motor by a worm provided on an output shaft of the adjustment motor and a worm wheel that is provided on the outer periphery of the rotating member and meshes with the worm.

According to this configuration, since the adjustment motor and rotating member are connected via a worm and a worm wheel, the rotating member can be freely rotated around the rotating shaft by rotation of the adjustment motor. Also, the adjustment motor can be made smaller and more efficient by reducing the rotation speed of the worm.

Furthermore, since the adjustment motor can be positioned orthogonal to the rotating shaft, it is possible to prevent the electric rotating machine itself from getting longer in the rotating shaft axial direction, and when used as, for example, an in-wheel motor of an electric two-wheeled vehicle or the like, a slim and compact power unit can be implemented.

An electric rotating machine according to another embodiment employs a configuration wherein, in an above configuration, the movable member and the rotating member are passed through by the rotating shaft and positioned adjacent to each other; a sliding face inclined with respect to the perpendicular plane on the rotor shaft is provided on the rotating shaft in one of the rotating member and the movable member, and a contacting area that is in contact with the sliding face in the rotating shaft axial direction is provided on the other; and a rotation-stopping member that prevents rotation of the movable member associated with rotation of the rotating member is provided on the outer periphery of the movable member.

According to this embodiment, the movable member and rotating member are contacted by sliding faces and contacting areas contacting these sliding faces in the rotating shaft axial direction, and the movable member prevents rotation of the movable section itself by the rotation-stopping member. Consequently, by rotation of the rotating member, the rotating member and movable member rotate relatively, force is applied by the rotating member via the sliding faces and contacting areas, and the movable member moves in the rotating shaft axial direction. By this, the relative positions of the rotor and stator can be controlled easily and accurately.

In addition, by rotation of the rotating member, a spring is positioned so as to apply force on the rotor or movable member on the side opposite the direction in which force is applied to the rotor, and thereby the rotating member and movable member can be in contact. It is also possible to omit a spring by setting the force applied by rotation of the rotating member so as to counteract the magnetic attraction between the rotor and stator. Also, there may be one inclined face or a plurality of inclined faces. The cross-sectional shapes of the movable member and rotation-stopping member may be fitting with part of a circular shape made a straight line, may be fitting in a polygonal shape, may be fitting in an odd shape other than a circular shape, and need not contact around the entire periphery.

An electric rotating machine according to another embodiment employs a configuration wherein, in an above configuration, the movable member has: a connecting section that connects the rotor in a freely rotatable fashion; and a engaging section that is provided integrally with the connecting section, and engages in a spiral (helical) form so as to be able to move relatively in the rotating shaft axial direction with respect to the rotating member; and rotation of the rotating member is displaced in the rotating shaft axial direction via the rotating member and the engaging section, and the rotor is moved in the rotating shaft axial direction via the connecting section.

According to this configuration, the movable member displaces rotation of the rotating member in the rotating shaft axial direction via the rotating member and engaging section, and moves the rotor in the rotating shaft axial direction via the connecting section. Therefore, it is possible to reliably control the amount of movement of the movable member by relative rotation of the rotating member and movable member, and adjust the gap between the rotor and stator. Examples of a state in which relative movement is possible spirally include skewed—for example, serration engaging of helical teeth, and engaging of a pin with a spiral long hole.

An electric rotating machine according to another embodiment employs a configuration wherein, in an above configuration, the rotating member and the engaging section are connected by screwing.

According to this configuration, as the rotating member and movable member are connected by screwing, the connecting parts of the rotating member and movable member can be made using an inexpensive process. Also, the amount of movement of the movable member per number of revolutions of the rotating member can be decreased, and thereby more precise control can be performed.

An electric rotating machine according to another embodiment employs a configuration wherein, in an above configuration, a rotation-stopping member that prevents rotation of the movable member associated with rotation of the rotating member is provided on the outer periphery of the movable member.

According to this embodiment, as rotation of the movable member associated with rotation of the rotating member is prevented by the rotation-stopping member, the movable member is moved in the rotating shaft axial direction by reliably preventing rotation of the movable member, thereby controlling the relative positions of the rotor and stator easily and accurately. The cross-sectional shapes of the movable member and rotation-stopping member may be fitting with part of a circular shape made a straight line, may be fitting in a polygonal shape, may be fitting in an odd shape other than a circular shape, and need not contact around the entire periphery.

An electric rotating machine according to another embodiment employs a configuration wherein, in an above configuration, the rotating shaft and the rotor can move relatively in the rotating shaft axial direction and rotate integrally in the rotation direction.

According to this configuration, as the rotating shaft and rotor move relatively in the rotating shaft axial direction and rotate integrally in the rotation direction, torque is transmitted and only the rotor moves in accordance with axial-direction movement of the movable member. As a result, compared to a case in which a connected tire or the like is moved when applied to a rotating shaft or electric vehicle, the weight and sliding loss of the object to be moved can be reduced, and efficiency can be improved. In addition, instability of rotor movement can be prevented.

An electric rotating machine according to another embodiment employs a configuration wherein, in an above configuration, the rotating shaft passes through the movable member and the rotating member.

According to this configuration, as the rotating shaft passes through the movable member and rotating member, the rotating shaft is stable by being pivoted by a stable member such as an arm. As a result, it is possible not only to reduce vibration and noise, but also to support the movable member and rotating member in a stably operable fashion, and reduce friction of sliding parts during operation. Furthermore, if an oil retaining bearing or the like is provided between the movable member and rotating shaft, inclination and so forth of the movable member is suppressed by the rotating shaft, and vibration, noise, and loss of both sliding sections can be reduced. Also, the movable member requires less space due to the configuration in which the rotating shaft is passed through.

An electric rotating machine according to another embodiment employs a configuration further having, in an above configuration, an energization member that applies force to the movable member in a direction in which force is counteracted, the force being applied to the movable member in the rotating shaft axial direction by magnetic attraction generated between the rotor and the stator.

According to this configuration, as the energization member counteracts the force applied to the movable member by magnetic attraction generated between the rotor and stator, it is possible to reduce the force necessary to move the movable member in opposition to magnetic attraction by the adjustment motor, rotating member, and so forth. Furthermore, since friction of the contact areas between the movable member and rotating member can be reduced, the torque required by the adjustment motor decreases. Therefore, it is possible to downsize the adjustment motor and reduce power consumption, and thereby possible to implement compact and highly efficient electric rotating machine.

An electric rotating machine according to another embodiment of the present invention employs a configuration wherein, in an above configuration, an output shaft of the adjustment motor is positioned approximately orthogonal to the rotating shaft.

According to this configuration, as the output shaft of the adjustment motor is positioned approximately orthogonal to the rotating shaft, the adjustment motor does not project in the axial direction of the electric rotating machine in the electric rotating machine itself, and the length of the electric rotating machine itself in the rotating shaft axial direction can be shortened. That is to say, when the electric rotating machine is used for an electric vehicle, and the rotating shaft functions as an axle shaft that rotates a drive wheel of the electric vehicle, as the adjustment motor is orthogonal to the rotating shaft, it is possible to shorten the vehicle width of a vehicle equipped with this electric rotating machine. Also, when used as an in-wheel motor of an electric two-wheeled vehicle or the like, a slim and compact power unit can be implemented.

An electric rotating machine according to another embodiment employs a configuration that includes: a rotating shaft; a rotor connected to the rotating shaft; a stator located facing the rotor; a movable member that moves the rotor in an axial direction of the rotating shaft through movement in the axial direction, and changes a relative position with respect to the stator; a rotating member that rotates around the rotating shaft; and an adjustment motor that is connected to the rotating member and rotates the rotating member; wherein the movable member is moved by converting rotation of the rotating member to displacement in the axial direction.

According to the above described configuration, the rotating member rotates around the rotating shaft by rotation of the adjustment motor, rotation of this rotating member is converted to displacement in the axial direction of the rotating shaft, the movable member is moved in an axial direction, the rotor is moved, and the relative position (gap) with respect to the stator is changed. Thus, even when the rotor is rotating, it is possible to adjust the gap between the rotor and stator, actively adjust the relative positions of the rotor and stator, and increase attraction and repulsion generated between the two when high torque is necessary, and decrease attraction and repulsion generated between the two when fast rotation is necessary, thereby freely changing output characteristics.

An electric vehicle according to another embodiment uses an electric rotating machine with an above described configuration(s) as a driving source.

According to this configuration, as an electric rotating machine with an above described configuration is used as a driving source, an electric vehicle is implemented whose drive characteristics can be freely adjusted.

An electric vehicle according to another embodiment employs a configuration wherein, in the above configuration, the electric rotating machine is connected to a vehicle body, and housed in a housing positioned in the axle shaft axial direction of a drive wheel; the rotating shaft of the electric rotating machine is an axle shaft that drives the drive wheel; and the adjustment motor of the electric rotating machine is positioned with its output shaft lying in the vehicle front-to-rear direction.

According to this configuration, as the electric rotating machine is housed in a housing with the rotating shaft as an axle shaft, and the adjustment motor is positioned with its output shaft lying in the vehicle front-to-rear direction, the housing can be made slim. That is to say, the electric rotating machine can be used as an in-hub type power unit, and when used as an in-wheel motor, for example, a slim and compact power unit can be implemented. The present application is based on Japanese Patent Application No. 2004-31379 filed on Feb. 6, 2004, the entire content of which is expressly incorporated herein by reference.

An electric rotating machine and electric vehicle according to some of the embodiments describe above can advantageously adjust the gap between a rotor and stator easily and reliably, thereby having an effect of adjusting and modifying output characteristics easily and freely while running, and are useful for application to an electric vehicle.

It also should be noted that certain objects and advantages of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof.

In addition, while a number of variations of the invention have been shown and described in detail, other modifications, which are within the scope of this invention, will be readily apparent to those of skill in the art based upon this disclosure. For example, it is contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow

What is claimed is:

1. An electric vehicle that uses an electric rotating machine as a driving source, said electric rotating machine comprising:
    a rotating shaft;
    a rotor connected to said rotating shaft;
    a stator located facing said rotor;
    a movable member that moves said rotor in an axial direction of said rotating shaft through movement in the axial direction, and changes a relative position with respect to said stator;
    a rotating member that rotates around said rotating shaft; and
    an adjustment motor with an output shaft positioned approximately orthogonal to said rotating shaft, that is connected to said rotating member and rotates said rotating member;
    wherein said movable member is moved by converting rotation of said rotating member to displacement in the axial direction;
    wherein said electric rotating machine is connected to a vehicle body, and housed in a housing positioned in an axle shaft axial direction of a drive wheel;
    wherein said rotating shaft of said electric rotating machine is an axle shaft that drives said drive wheel; and
    wherein said adjustment motor of said electric rotating machine is positioned with its output shaft lying in a vehicle front-to-rear direction.

2. An electric vehicle that uses an electric rotating machine as a driving source, said electric rotating machine comprising:
    a rotating shaft;
    a rotor connected to said rotating shaft;
    a stator located facing said rotor; and
    an adjustment section that adjusts relative positions of said rotor and said stator in the rotating shaft axial direction;
    wherein said adjustment section comprises:
        an adjustment motor that has an output shaft positioned approximately orthogonal to said rotating shaft;
        a rotating member that is connected to said adjustment motor and rotates around said rotating shaft by rotation of said adjustment motor; and
        a movable member that moves in the rotating shaft axial direction by rotation of said rotating member, and moves said rotor in the rotating shaft axial direction;
    wherein said electric rotating machine is connected to a vehicle body, and housed in a housing positioned in an axle shaft axial direction of a drive wheel;
    wherein said rotating shaft of said electric rotating machine is an axle shaft that drives said drive wheel; and
    wherein said adjustment motor of said electric rotating machine is positioned with its output shaft lying in a vehicle front-to-rear direction.

3. The electric vehicle according to claim 2, wherein, with regard to said rotating member, a driving force of said adjustment motor is transmitted by an output gear section provided on an output shaft of said adjustment motor and a gear section that is provided on an outer periphery of said rotating member and meshes with said output gear section.

4. The electric vehicle according to claim 2, wherein said rotating member is connected to said adjustment motor by a worm provided on an output shaft of said adjustment motor and a worm wheel that is provided on an outer periphery of said rotating member and meshes with said worm.

5. The electric vehicle according to claim 2, wherein: said movable member comprises:
    a connecting section that connects said rotor in a freely rotatable fashion; and
    an engaging section that is provided integrally with said connecting section, and engages in a spiral (helical) form so as to be able to move relatively in the rotating shaft axial direction with respect to said rotating member; and
    rotation of said rotating member is displaced in the rotating shaft axial direction via said rotating member and said engaging section, and said rotor is moved in the rotating shaft axial direction via said connecting section.

6. The electric vehicle according to claim 5, wherein said rotating member and said engaging section are connected by screwing.

7. The electric vehicle according to claim 5, wherein a rotation-stopping member that prevents rotation of said movable member associated with rotation of said rotating member is provided on an outer periphery of said movable member.

8. The electric vehicle according to claim 2, wherein said rotating shaft and said rotor can move relatively in the rotating shaft axial direction and rotate integrally in a rotation direction.

9. The electric vehicle according to claim 2, wherein said rotating shaft passes through said movable member and said rotating member.

10. An electric rotating machine comprising:
    a rotating shaft;
    a rotor connected to said rotating shaft;
    a stator located facing said rotor; and
    an adjustment section that adjusts relative positions of said rotor and said stator in the rotating shaft axial direction;
    wherein said adjustment section comprises:
        an adjustment motor that has an output shaft positioned approximately orthogonal to said rotating shaft;
        a rotating member that is connected to said adjustment motor and rotates around said rotating shaft by rotation of said adjustment motor; and
        a movable member that moves in the rotating shaft axial direction by rotation of said rotating member, and moves said rotor in the rotating shaft axial direction;
    wherein said electric rotating machine is configured to be connected to a vehicle body, and housed in a housing positioned in an axle shaft axial direction of a drive wheel;
    wherein said rotating shaft of said electric rotating machine is an axle shaft that drives said drive wheel; and
    wherein said adjustment motor of said electric rotating machine is positioned with its output shaft lying in a vehicle front-to-rear direction.

* * * * *